(12) United States Patent
Lawson et al.

(10) Patent No.: US 11,498,208 B2
(45) Date of Patent: Nov. 15, 2022

(54) ROBOT ARM DRIVE MODULE

(71) Applicant: Foster-Miller, Inc., Waltham, MA (US)

(72) Inventors: John R. Lawson, Petersham, MA (US);
Robert E. Overman, Acton, MA (US);
Wesley Bird, Haverhill, MA (US);
Stephen Putnam, Littleton, MA (US);
Dominick Freeman, Brighton, MA (US); Timothy J. Mason, Uxbridge, MA (US)

(73) Assignee: Foster-Miller, Inc., Waltham, MA (US)

( * ) Notice: Subject to any disclaimer, the term of this patent is extended or adjusted under 35 U.S.C. 154(b) by 112 days.

(21) Appl. No.: 17/128,487

(22) Filed: Dec. 21, 2020

(65) Prior Publication Data
US 2022/0193889 A1 Jun. 23, 2022

(51) Int. Cl.
| | | |
|---|---|---|
| B25J 18/04 | (2006.01) | |
| B25J 9/10 | (2006.01) | |
| F16H 35/10 | (2006.01) | |
| F16H 48/22 | (2006.01) | |
| F16H 1/20 | (2006.01) | |

(52) U.S. Cl.
CPC .............. B25J 9/102 (2013.01); F16H 1/203 (2013.01); F16H 35/10 (2013.01); F16H 48/22 (2013.01)

(58) Field of Classification Search
CPC ........... F16H 1/203; F16H 48/22; F16H 1/145
See application file for complete search history.

(56) References Cited

U.S. PATENT DOCUMENTS

| | | |
|---|---|---|
| 3,321,172 A | 5/1967 | Buss |
| 5,155,423 A | 10/1992 | Karlen et al. |
| 5,746,464 A | 5/1998 | Paul |
| 8,333,129 B2 | 12/2012 | Johnson et al. |
| 9,321,172 B2 | 4/2016 | Johnson et al. |
| 10,414,039 B2 * | 9/2019 | Meeker ................... B25J 18/02 |
| 2007/0281824 A1 | 12/2007 | Tezuka et al. |
| 2012/0215358 A1 | 8/2012 | Gettings et al. |

OTHER PUBLICATIONS

H.X. Zhang et al., "Development of a Low-Cost Flexible Modular Robot GZ-I", IEEE Conference Paper, Aug. 2008, DOI:10.1109/AIM.2008.4601663, IEEE Xplore, seven (7) pages total.

* cited by examiner

*Primary Examiner* — Randell J Krug
(74) *Attorney, Agent, or Firm* — Iandiorio Teska & Coleman, LLP

(57) ABSTRACT

A drive module for rotating a first robot arm member relative to a second robot arm member comprising a motor, a gear head driven by the motor, a pinion driven by the gear head and a slip clutch including an input section with integral gear teeth driven by the pinon, and an output section configured to be coupled to the second robot arm member. A housing is disposed at least about the pinion and slip clutch and configured to be coupled to the first robot arm member.

28 Claims, 16 Drawing Sheets

ROBOT ARM DRIVE MODULE

FIELD OF THE INVENTION

This invention relates, in one aspect, to a remotely controlled ground robot with a manipulator arm and drive modules therefore.

BACKGROUND OF THE INVENTION

Remotely controlled ground robots are useful in a variety of civilian, military, and law enforcement applications. Missions include searching, inspection, reconnaissance, surveillance, bomb disposal, and the like. A manipulator arm coupled to the robot chassis is often used in a variety of different robot missions. A manipulator arm may include a shoulder joint rotatably mounted to the robot chassis, an upper arm pivotably mounted to the shoulder joint, and a forearm pivotably mounted to the upper arm via an elbow joint. Also included may be a wrist joint and an end effector coupled to the wrist joint.

There are a variety of drive assemblies (motors, gears, and the like) for rotating the shoulder joint, pivoting the upper arm relative to the shoulder joint, and pivoting the forearm relative to the upper arm. See U.S. Published Application No. 2012/0215358 and U.S. Pat. Nos. 3,321,172; 5,155,423; and 8,333,129 all incorporated herein by this reference.

Slip clutches are sometimes used in robotic arm drives to prevent damage to the robot arm or the drive itself should the robot, for example, fall off a landing or down a set of stairs. And, slip clutches allow the robot arm to be folded when the robot's batteries have run down or when power to the robot is not turned on. In some embodiments, it is desirable for the manipulator arm to fold down compactly between the robot main chassis tracks for portability. See U.S. Pat. No. 10,414,039 incorporated herein by this reference.

But, conventional slip clutches typically require sufficient space in the drive module, add weight, and can be complex.

SUMMARY OF THE INVENTION

Featured in one embodiment is a new robot manipulator arm drive module incorporating a slip clutch to prevent damage to the robot arm and/or drive module and to allow for manually folding the arm in a manner which does not increase the size of the drive module, its weight, or complexity.

Featured in one example is the realization that if the slip clutch input section is machined to include driven spiroid gear teeth, damage to the robot arm and/or drive module is prevented and yet the drive module is compact and lightweight. A clutch plate with an integrated spiroid face gear in one embodiment reduces the size, weight, and complexity of the drive module. The compact construction of the drive module is amenable to fast and easy repair as a complete drive module can be swapped out in the field for repair. The slip clutch of the drive module allows the arm to withstand mechanical overloads like falling down a flight of stairs without breaking a joint. The slip clutch also allows the arm to be rapidly stowed when the arm is unpowered. In one preferred embodiment the combination of planetary and spiroidal gears yield smooth motion and also provides a large gear ratio. Also, the combination of planetary and spiroidal gears is back drivable useful for stowing the arm when unpowered.

Featured is a drive module for rotating a first robot arm member relative to a second robot arm member. A preferred drive module includes a motor, a gear head driven by the motor, a pinion driven by the gear head, and a slip clutch including an input section with integral gear teeth driven by the pinion, and an output section configured to be coupled to the second robot arm member. A housing is disposed at least about the pinion and slip clutch and configured to be coupled to the first robot arm member.

In one version, the motor and gear head extends from the housing and resides in the first robot arm member. In another version, the drive module further includes a belt or chain arrangement between the gear head and the pinion and the gear head drives the pinion via the belt or chain arrangement. In this version, the motor and gear head may reside in the housing which is coupled to the first arm member. In one preferred example, the first arm member is an upper arm and the second arm member is a shoulder. The first arm member may be a forearm and the second arm member may be an upper arm. The first arm member may be a shoulder and the second arm member may be a shoulder mount.

The gear teeth may form a spiroid gear. Preferably, the pinion rotates around a first axis and the input section rotates about a second axis which does not intersect the first axis.

The drive module may further include a friction disc between the first robot arm member and the second robot arm member and adjustable screws engaging the friction disc providing a tunable friction force between the first and second robot arm members. The adjustable screws can incorporate a spring-loaded plunger.

The clutch output section preferably includes a hub with friction members mounted on an interior face thereof and the slip clutch input section includes a clutch plate with gear teeth on an outer face thereof and with an inner face which contacts with the friction members. In one version, the hub includes a post and the clutch plate includes an orifice receiving the post therethrough. The slip clutch may further include a fastener secured to the post and a spring member between the fastener and the clutch plate for biasing the clutch plate inner face into engagement with the friction members. The clutch plate may include a raised rim and said spring member is seated on said raised rim.

Also featured is a drive module for rotating a first robot arm member relative to a second robot arm member comprising a motor, a pinion driven by the motor, and a slip clutch. One preferred slip clutch includes a clutch plate with gear teeth formed on an outer surface thereof engaging the pinion and also including an inner face, a hub configured to be coupled to the second robot arm member and including friction members mounted on an interior face thereof contacting the clutch plate inner face, and a spring member biasing the clutch plate inner face into engagement with said friction members on the hub inner face.

Also featured is a drive module for rotating a first robot arm member relative to a second robot arm member comprising a motor, a pinion driven by the motor and a slip clutch. One preferred slip clutch includes a clutch plate with gear teeth formed on an outer surface thereof engaging the pinion and also including an inner face, a hub configured to be coupled to the second robot arm member and including friction members mounted on an interior face thereof contacting the clutch plate inner race and a post received through the clutch plate, and a spring member about the post biasing the clutch plate inner face into engagement with said friction members on the hub inner face.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
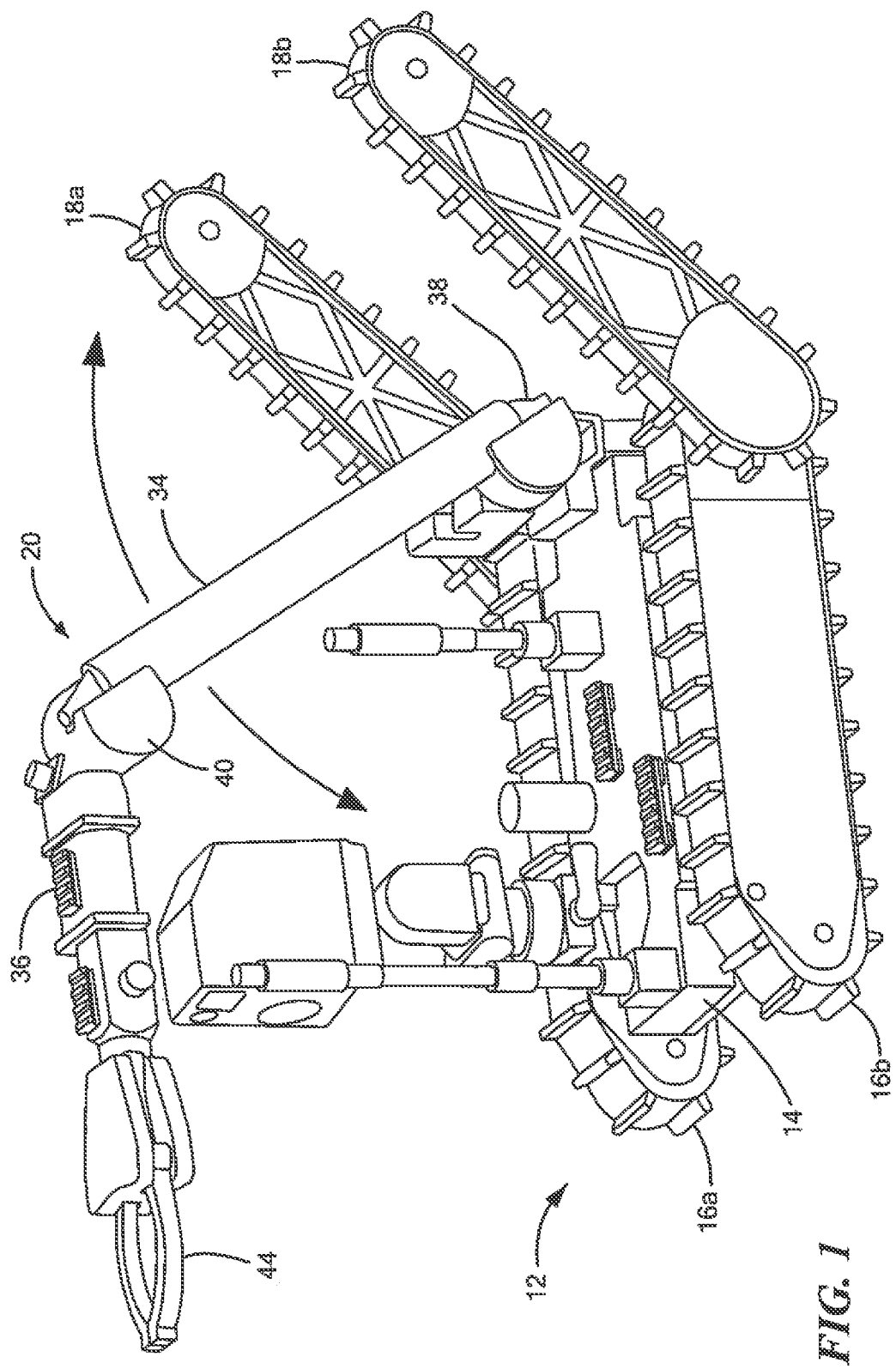
FIG. 1 is a schematic view of an example of a robot configuration including one or more manipulator arm drive modules.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
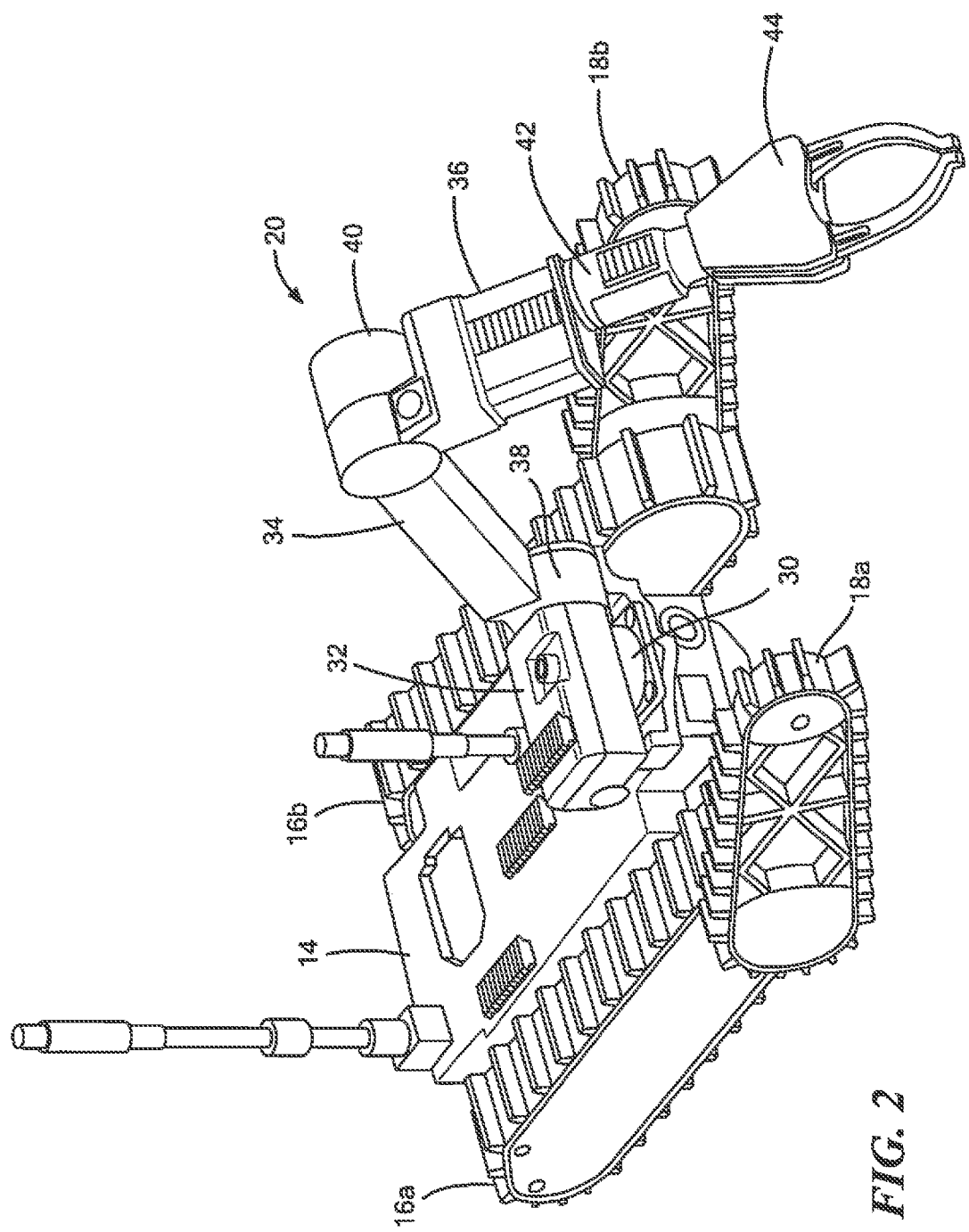
FIG. 2 is another schematic view of an example of a robot chassis including a shoulder yaw drive module.

FIGS. 1-2 show an example of a remotely controlled ground robot 12 with chassis 14 and right 16a and left 16b drive tracks. Rear tracked flippers 18a, 18b are optional. Robot manipulator arm 20 includes shoulder mount 30 fixed to the chassis, shoulder drive module 32 which rotates (yaw) relative to mount 30, upper arm 34, upper arm drive module 38 which rotates (pivots) upper arm 34 relative to the shoulder drive module, forearm 36, and elbow drive module 40 which rotates (pivots) forearm 36 relative to upper arm 34. Also included may be rotating wrist 42 and end effector 44.

Figure 3:
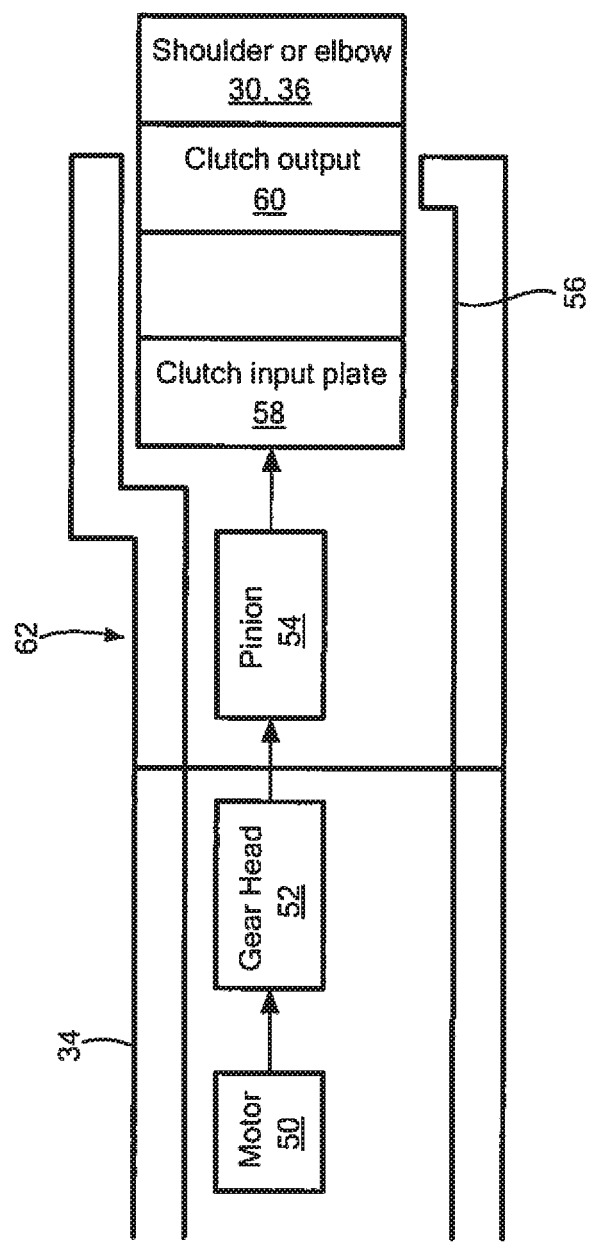
FIG. 3 is a block diagram showing the primary components associated with one version of a drive module in an example of the invention.

FIG. 3 shows a suitable drive module which may be used for drive modules 38 and 40, FIG. 2. Motor 50 drives gear head 52 which drives pinion 54. Pinion 54, in turn drives slip clutch 56 input section (e.g., plate 58) with integral gear teeth formed (e.g., machined) therein. Clutch output section 60 is coupled to either shoulder drive module 32, FIG. 2 (for an upper arm drive module) or to the proximal end of forearm 36 (for a forearm drive module). Drive module housing 62 includes therein pinion 54 and clutch 56 with clutch output section 60 rotatable relative to housing 62. Motor 50 and gear head 52 extend outwardly from drive module housing 62 and reside within robot upper arm 34 itself coupled to drive module housing 62.

Figure 4:
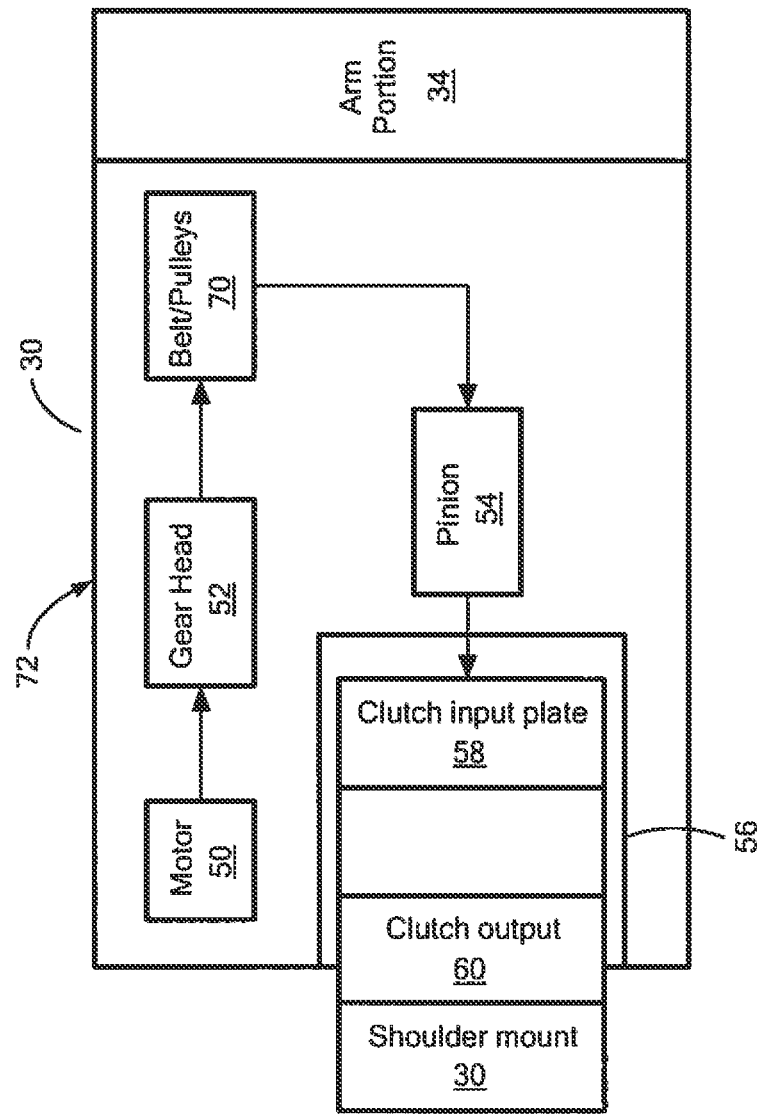
FIG. 4 is a schematic block diagram showing the general configuration of another drive module in another example of the invention.

For the shoulder drive module, less space is taken up if the motor and gear head do not extend outward from the shoulder drive module. Thus, as shown in the example of FIG. 4, motor 50 drives gear head 52 which drive pinion 54 via a belt and pulley arrangement 70 so that pinion 54 and clutch 56 reside underneath motor 50 and gear head 52. Shoulder drive module 30 housing 72 encloses all these components and is mounted to upper arm 34. Clutch output section 60 is coupled to shoulder mount 30. The gear head may provide a gear ratio of 231:1.

Figure 5:
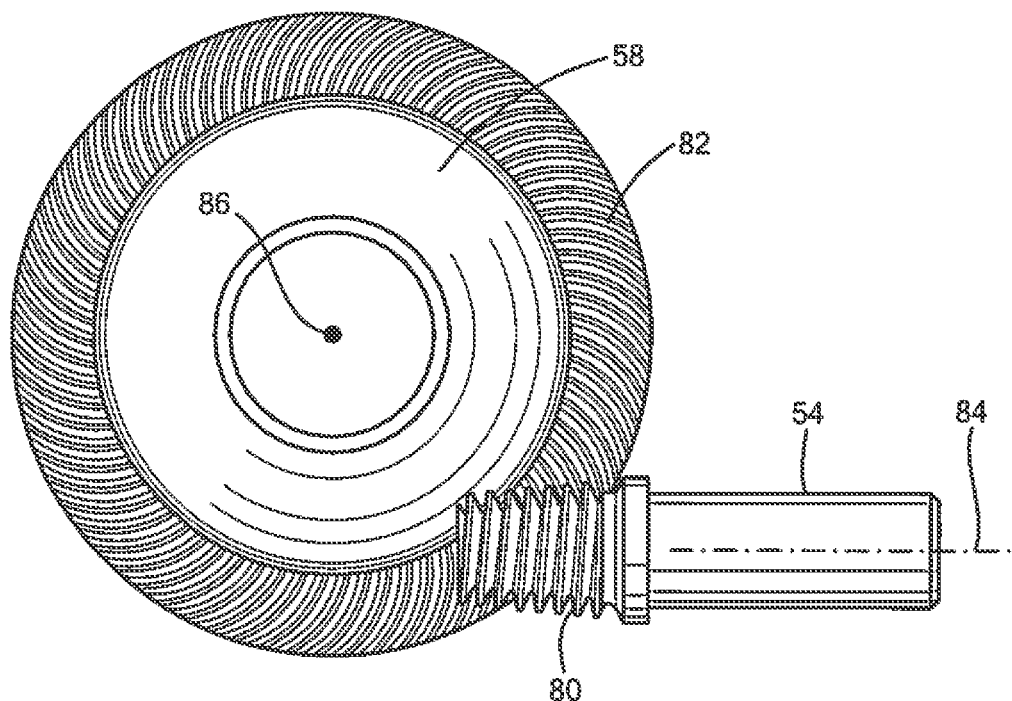
FIG. 5 is a schematic view showing how a pinion driven by a motor and optional gear head engages the face gear of a clutch input section.
Figure 6:
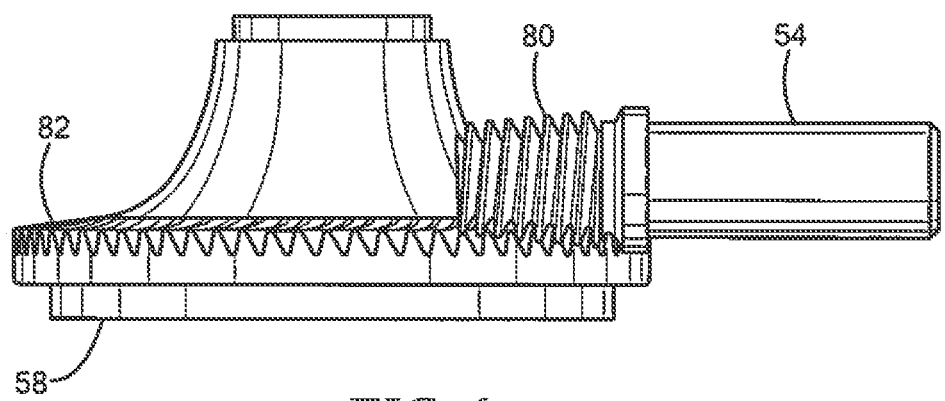
FIG. 6 is another view of the pinion and face gear.
Figure 7:
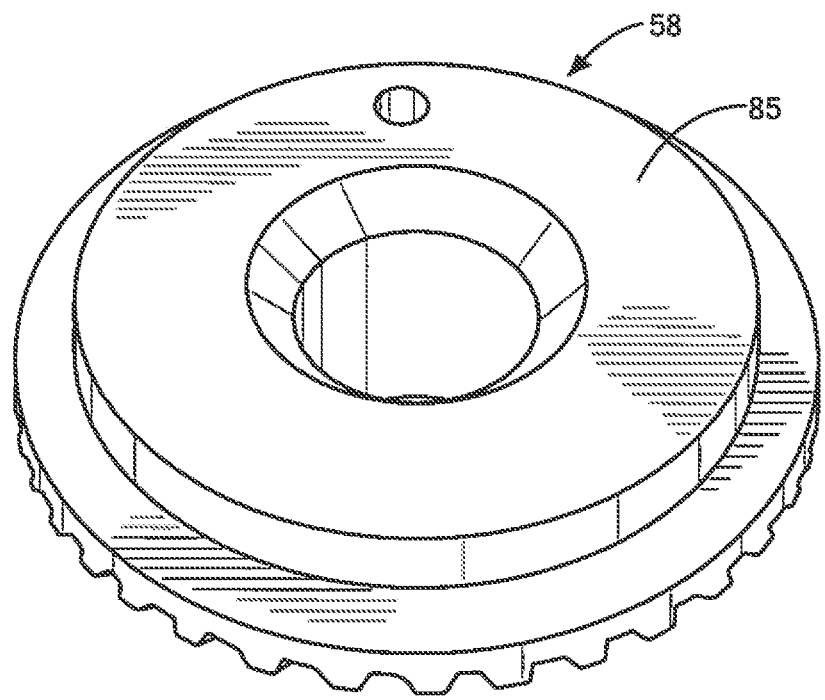
FIG. 7 is a schematic rear view of the face gear showing the inside surface thereof.
Figure 8:
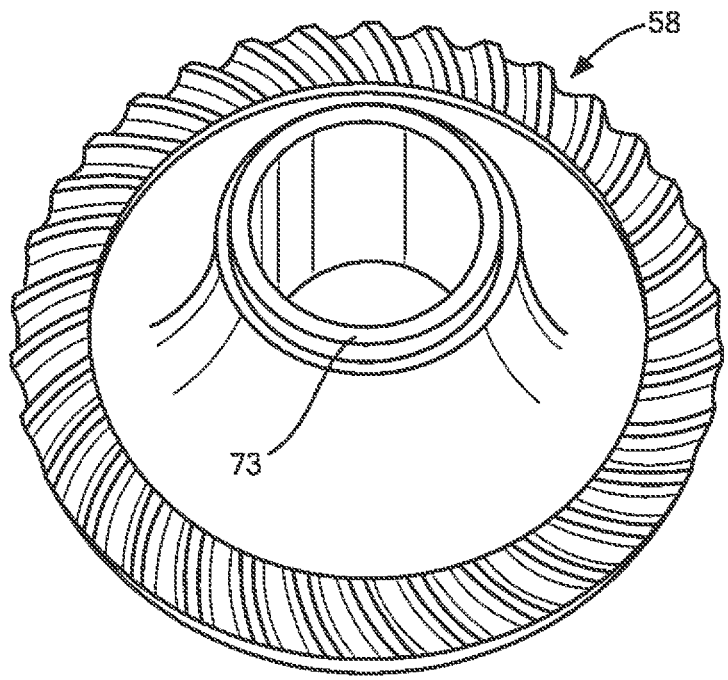
FIG. 8 is another schematic view showing a configuration of the face gear.

FIGS. 5-6 show pinion 54 with distal teeth 80 (preferably spiroidal) engaging clutch input plate gear teeth 82 (preferably spiroidal). Preferably, the clutch input section plate is machined to form a spiroid gear. Pinion 54 rotates about axis 84 while gear 58 rotates about axis 86. FIGS. 7-8 also show the spiroid gear which, as noted above, serves as a slip clutch plate.

Figure 9:
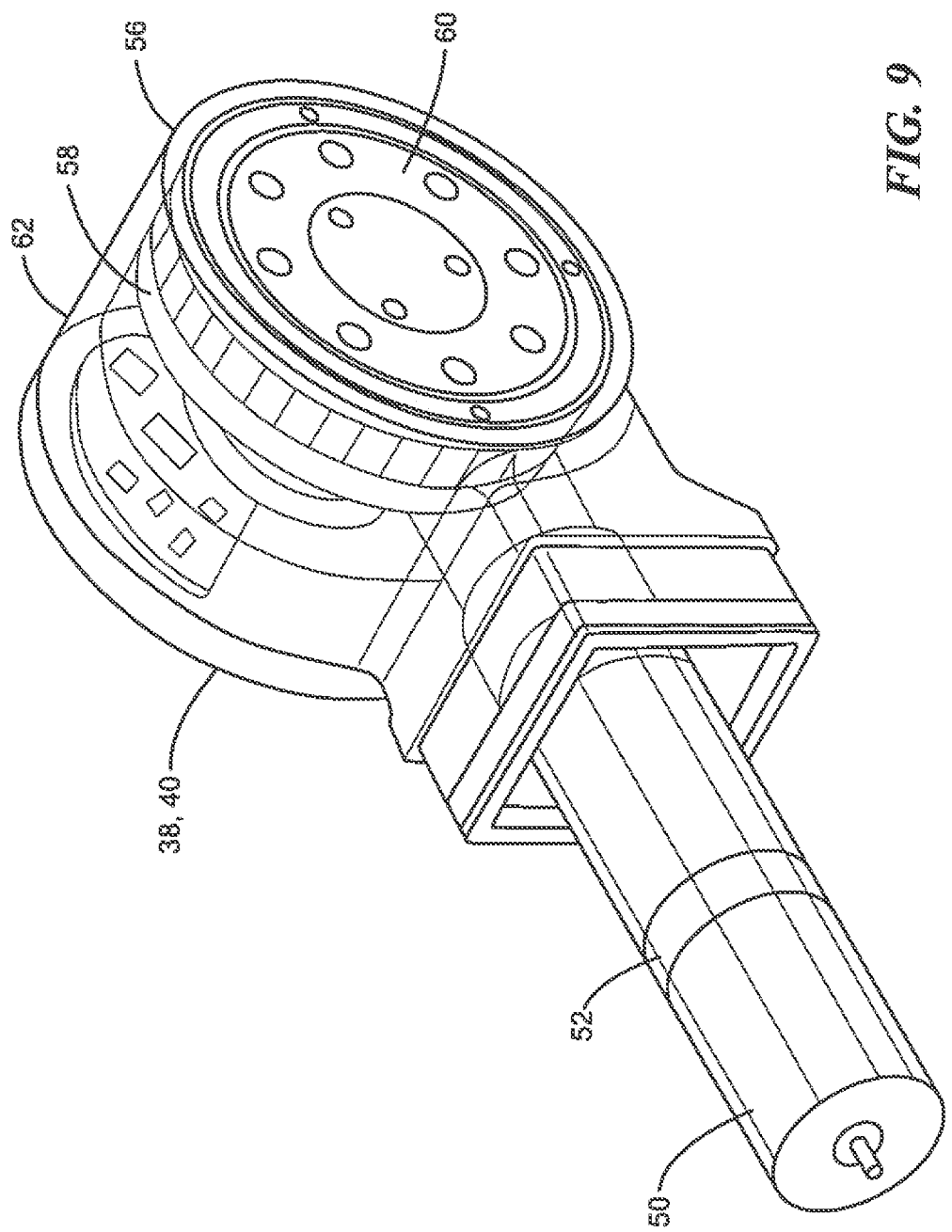
FIG. 9 is a schematic view showing an example of a compact drive module.
Figure 10:
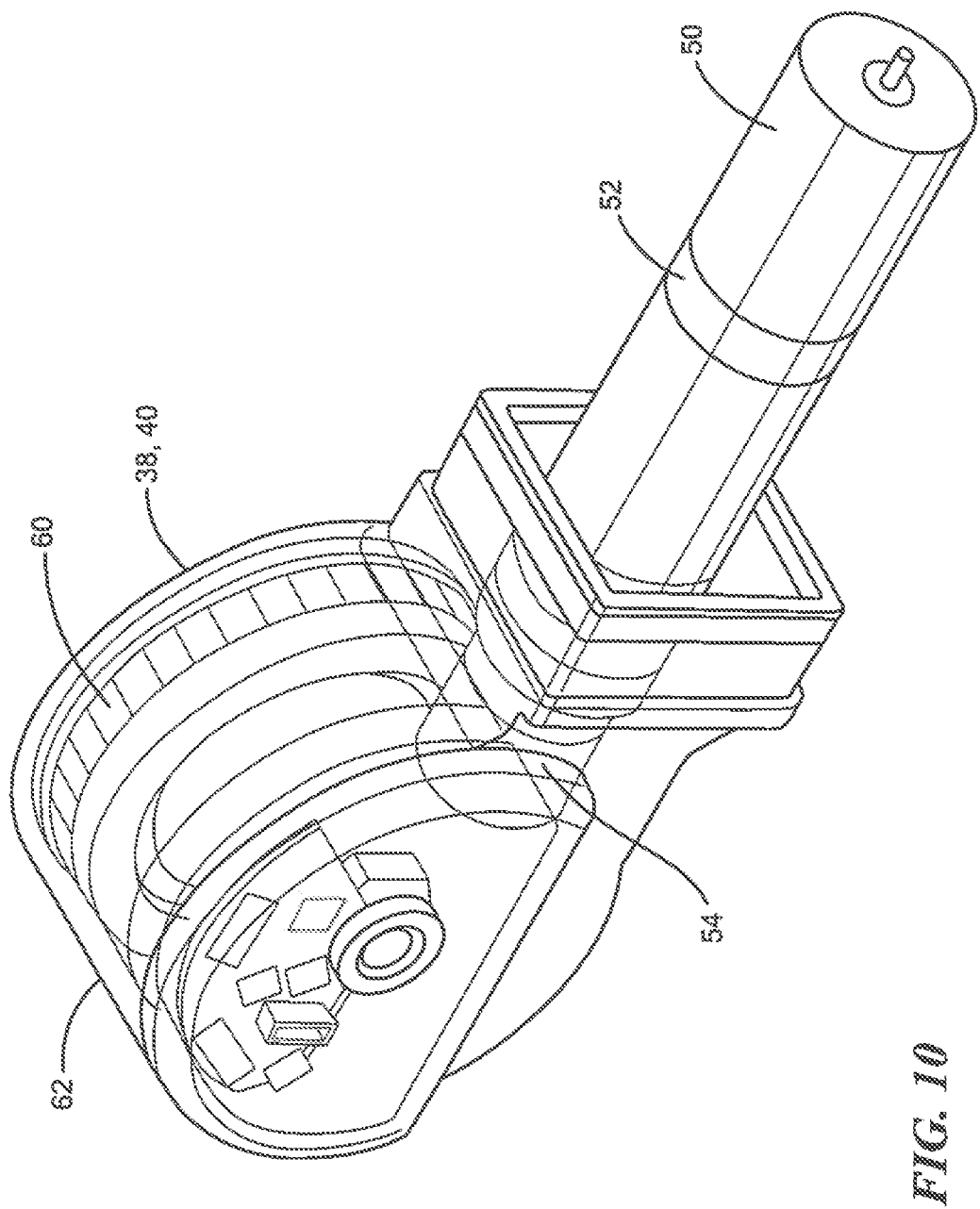
FIG. 10 is another schematic view of the drive module of FIG. 9.

FIGS. 9-10 show an exemplary upper arm drive module and forearm drive module. The motor may be a brush DC motor and preferably the gear head is a planetary gear head. Also shown is how the drive module itself can include a motor controller, a magnetic encoder, and a magnet for the encoder. Each drive module may receive and pass through power (e.g., 24 DC), ethernet communications, and controller area network communications. The spiroid gear turns the output 90° from the axis of the motor and provides a mechanical advantage (approximately 8:1).

Figure 11:
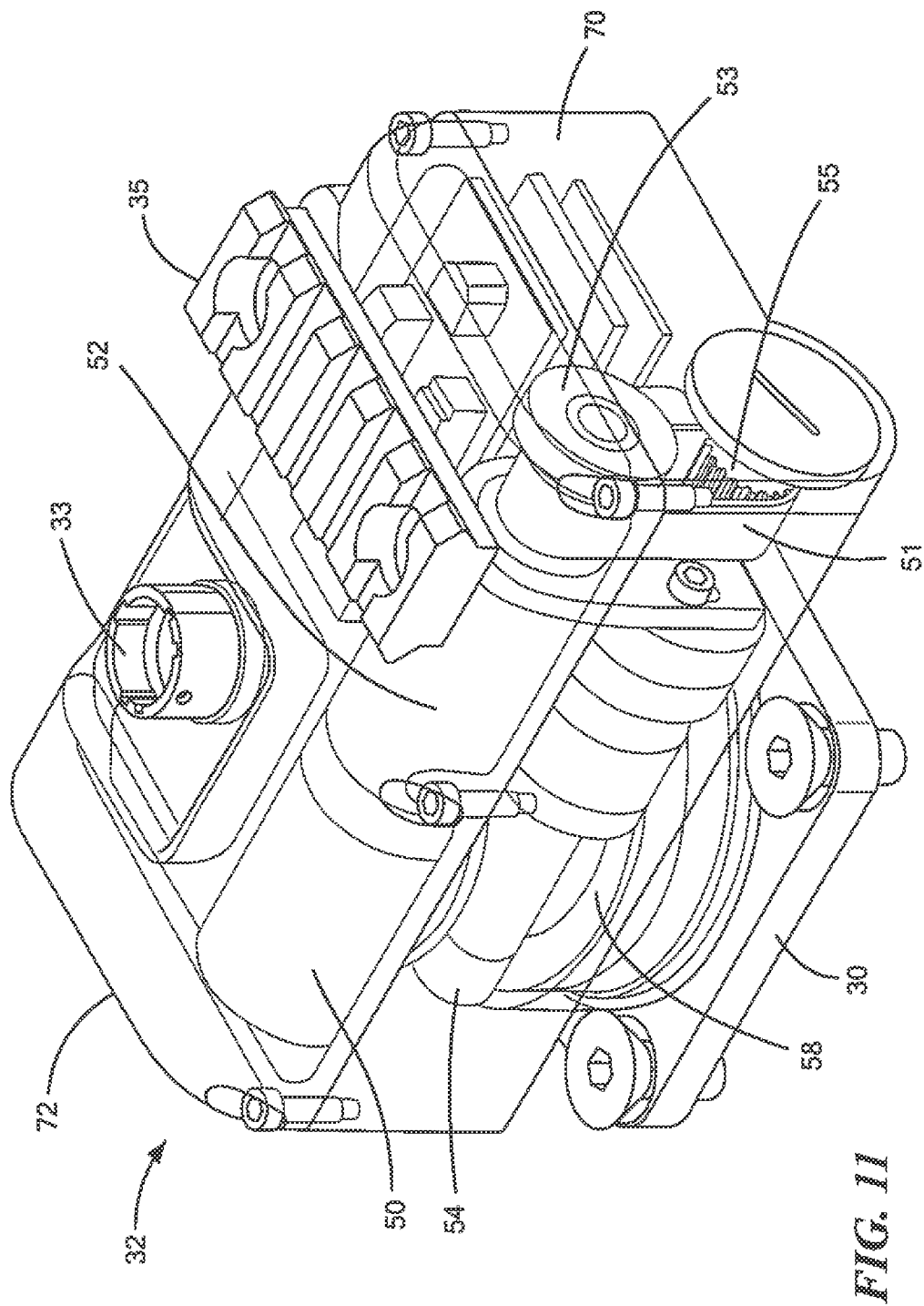
FIG. 11 is a schematic view of another embodiment of a drive module.
Figure 12:
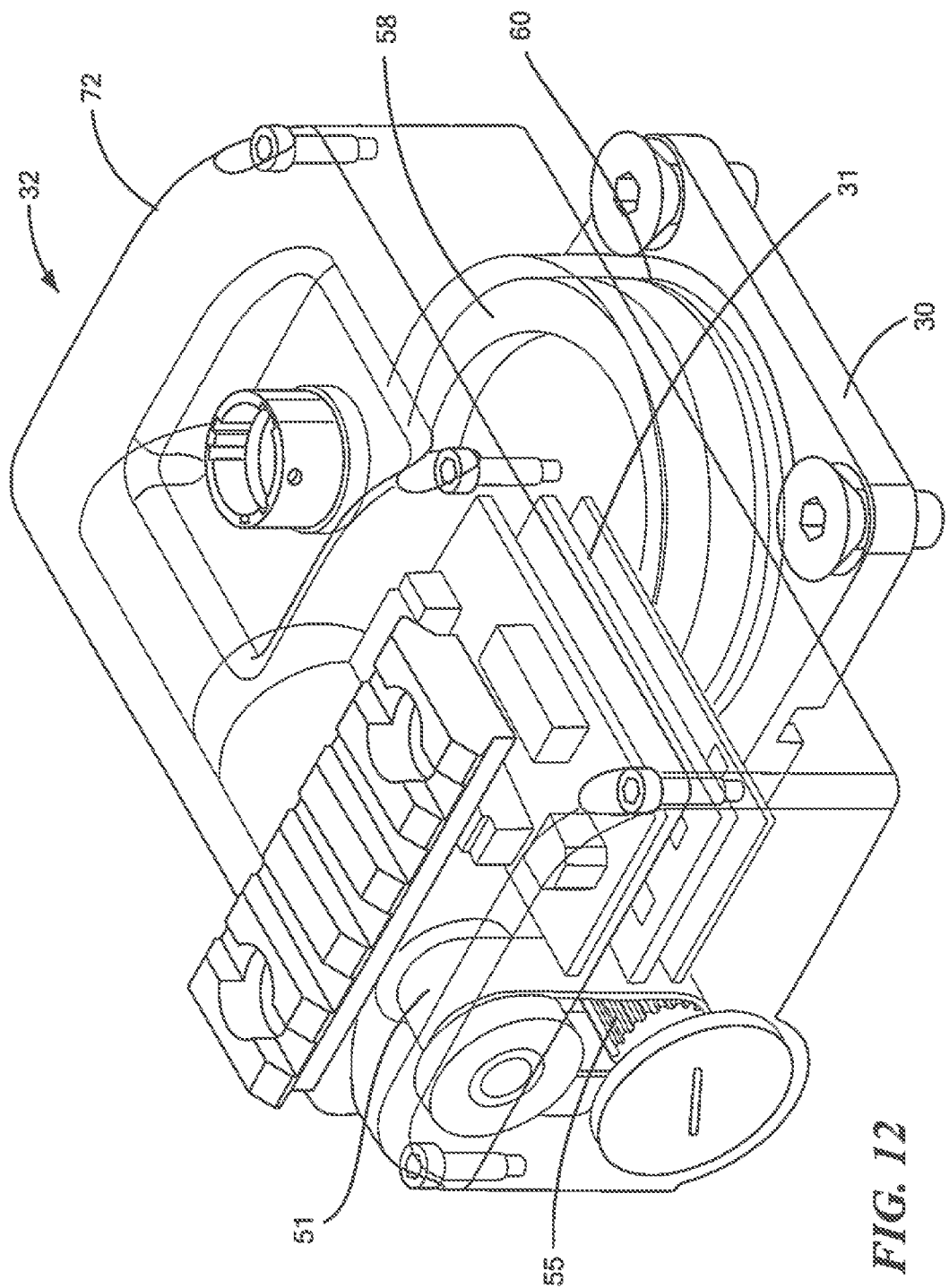
FIG. 12 is another schematic view of the drive module of FIG. 11.

FIGS. 11-12 show an exemplary shoulder drive module 32. Planetary gear head 52 is driven by motor 50 and drives pinion 54 via belt 51 about pulley 53 and gear 55. A chain may also be used. Housing 72 may also contain therein a master computer which receives Joint Architecture For Unmanned Systems Commands over Ethernet and translates these commands into motion commands to the individual joints. A network switch allows payloads connected to any of the three interoperability profile ports to access the ethernet network, for example, to stream video from arm-mounted cameras or to convey readings from arm-mounted chemical, biological, radiological, or nuclear sensors. The drive module may include diametrically magnetized permanent magnet attached to the output of the slip clutch and a magnetic encoder integrated circuit may be a part of the motor controller board. Using this magnetic encoder, the absolute position of the output can be measured. The three circuit board stack as shown as 31 may include a master computer, network switch, and a motor controller. An IOP port is shown at 33 and a picatinny rail mount is shown as 35.

Figure 13:
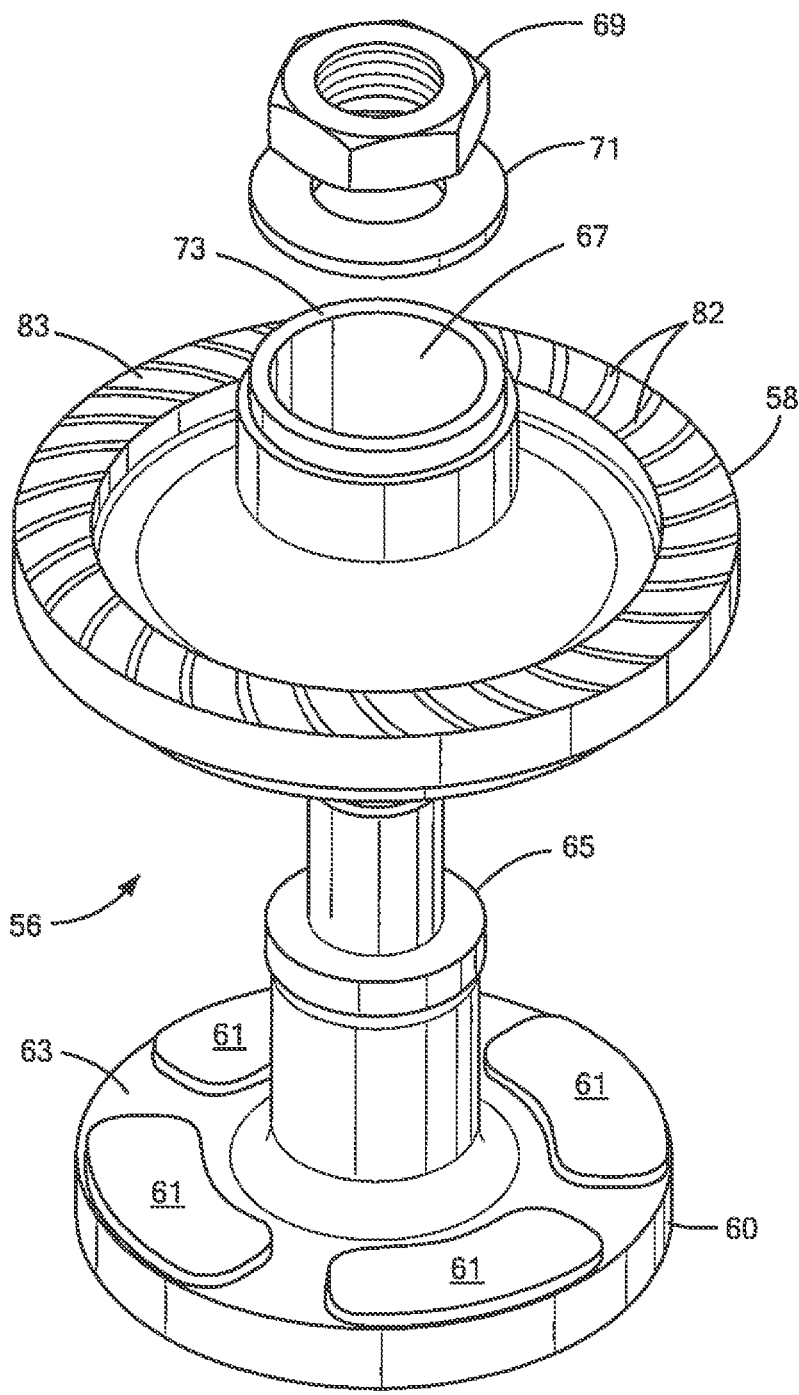
FIG. 13 is a schematic view of an exemplary clutch assembly.
Figure 14:
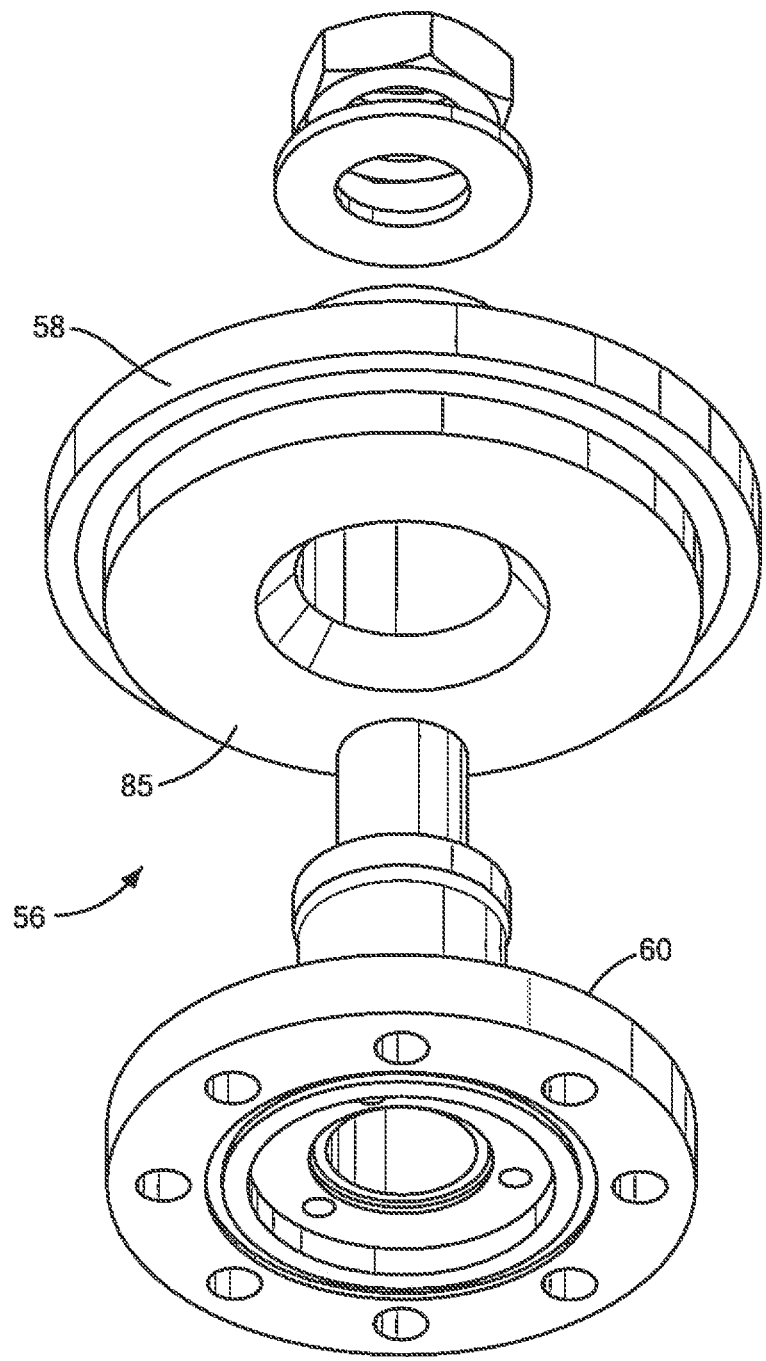
FIG. 14 is another schematic view of an exemplary clutch assembly.
Figure 15:
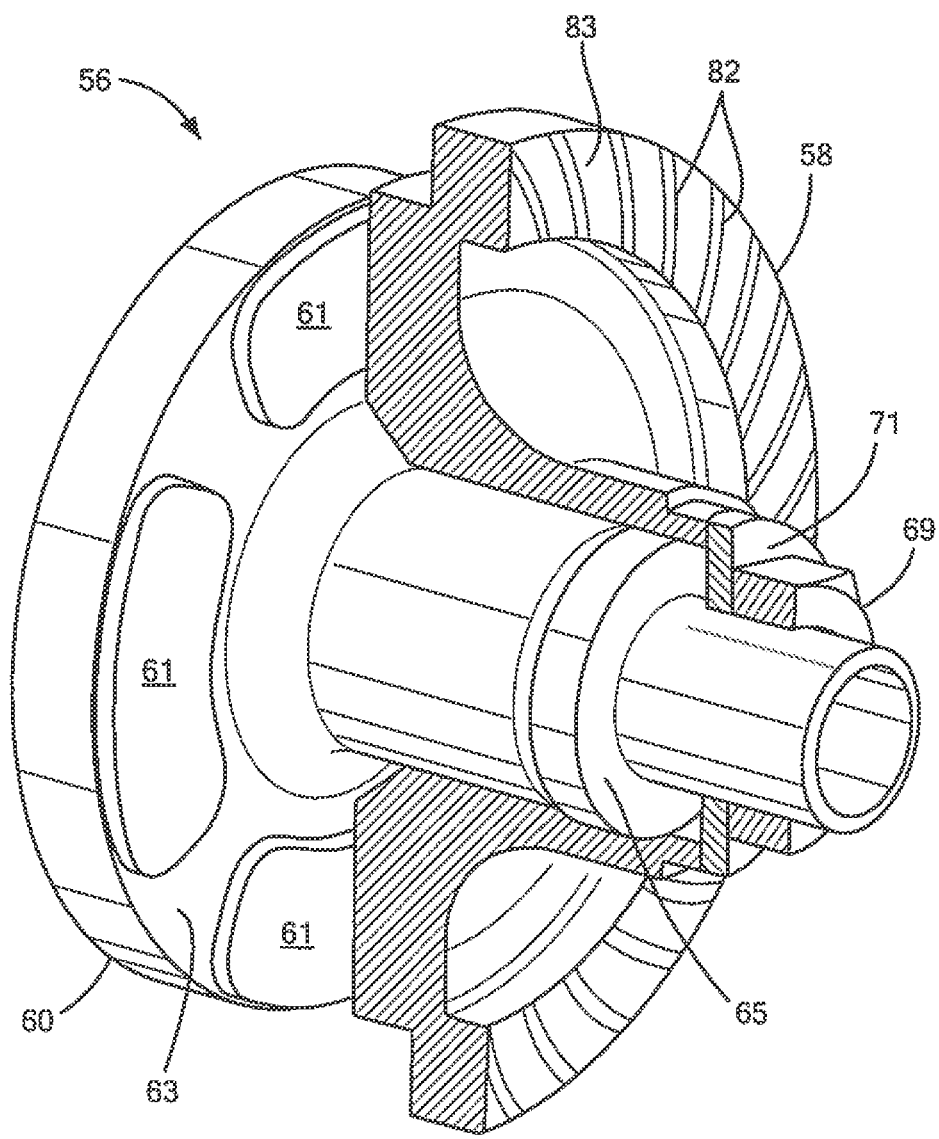
FIG. 15 is a schematic view of the clutch plate of FIGS. 13-14 assembled with the clutch hub.

Slip clutch 56, FIGS. 13-15 in one embodiment includes a hub 60 (the clutch output) with friction members 61 mounted on interior face 63 thereof and the slip clutch input section includes a clutch plate 58 with gear teeth 82 on an outer face 83 thereof and with an inner face 85 which mates with friction members 61. The hub 60 may include a stepped post 65 and the clutch plate 58 includes an orifice 67 receiving the post 65 therethrough. A fastener (e.g., nut 69) is secured to the distal end of post 65 and a spring member such as Belville washer 71 between fastener 69 and the clutch plates biases the clutch plate 58 face 85 into engagement with the friction members. Washer 71 may seat on clutch plate 58 inner raised rim 73 underneath nut 60 which is secured to the distal threaded end of post 65. In one example, the drive module provided peak torque of the 10.0 Nm at a maximum speed of 67 RPM.

Figure 16:
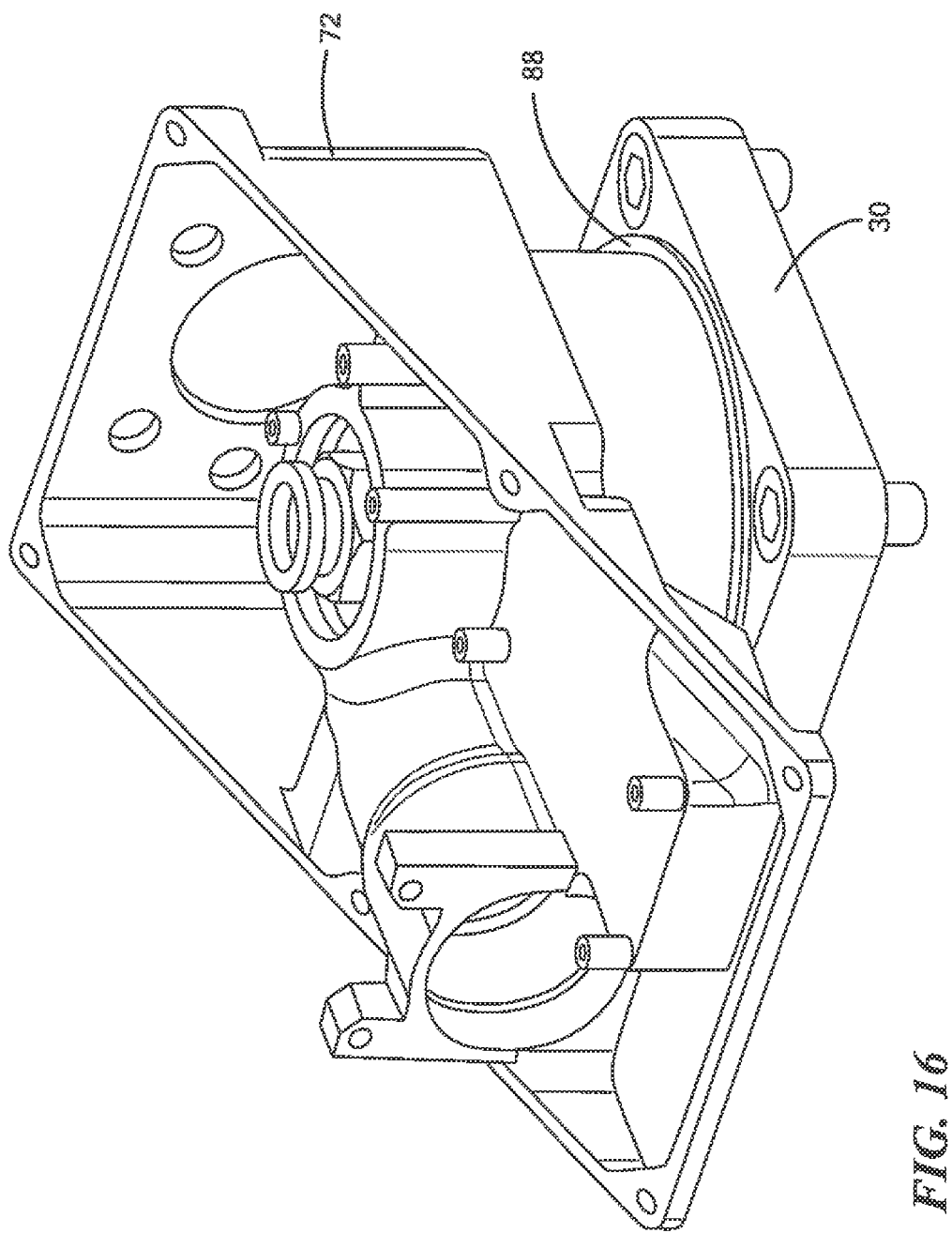
FIG. 16 is a partially assembled view of the drive module of FIG. 11 showing a friction disc placed between the moving and stationary portions of the joint.
Figure 17:
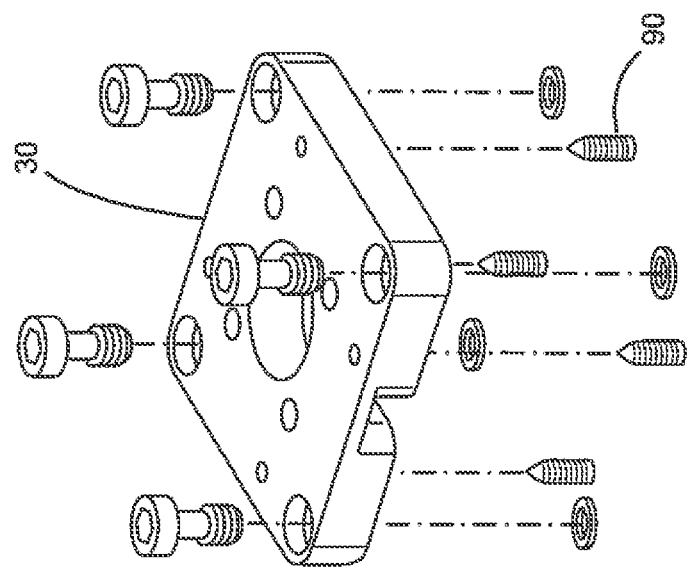
FIG. 17 is an exploded view of the shoulder mount showing spring plungers that apply a mechanical load to the friction disc.

Backlash in the gears and mechanical compliance of the arm may cause stick-slip motion in the lightly loaded shoulder yaw joint 32 of FIGS. 11-12. To mitigate the stick-slip motion, friction disc 88, FIG. 16 can be positioned to provide friction force between housing 72 and shoulder mount 30 in some embodiments. The friction ring may be attached to the housing, for example with epoxy. To provide a tunable amount of friction, steel spring plungers 90, FIG. 17 are inserted into shoulder mount 30. The spring in each of the plungers engages the friction disc, creating a friction force when the friction ring moves. The amount of friction is tunable by selecting plungers with a different spring stiffness and/or varying the engagement of the plungers.

Figure 18:
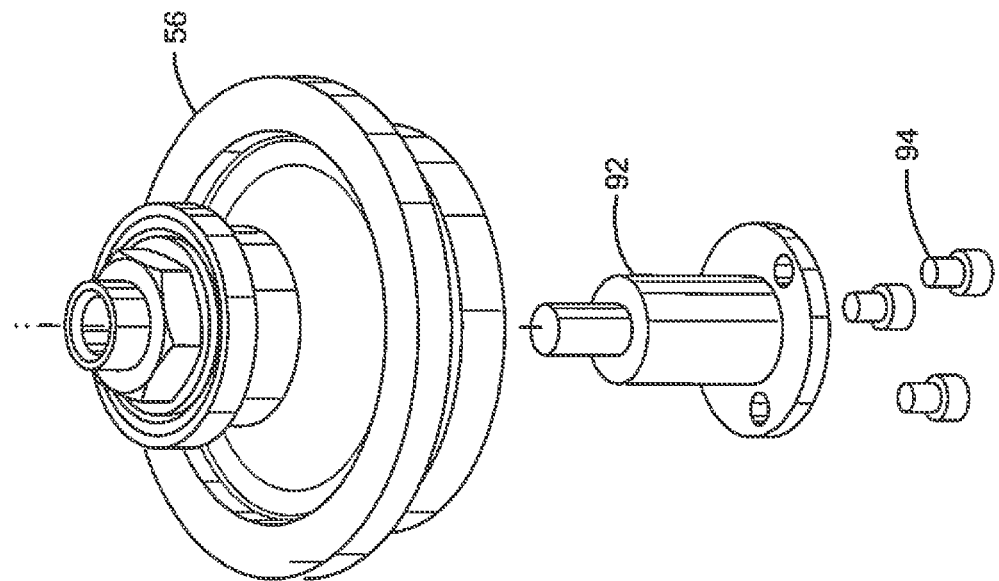
FIG. 18 is a schematic view showing a slip ring used to carry electrical signals from through the bore of the clutch.

To enable a large range of joint motion, some embodiments incorporate slip ring 92 shown in FIG. 18. Bolts 94 secure one side of the slip ring to the output side of clutch 56. Slip ring assembly 92 extends through the bore of the clutch, allowing electrical signals to pass though the input side of the clutch and into the drive module from the previous arm section. The slip ring may carry Ethernet, Controller Area Network, and DC power signals to the drive module.

Figure 19:
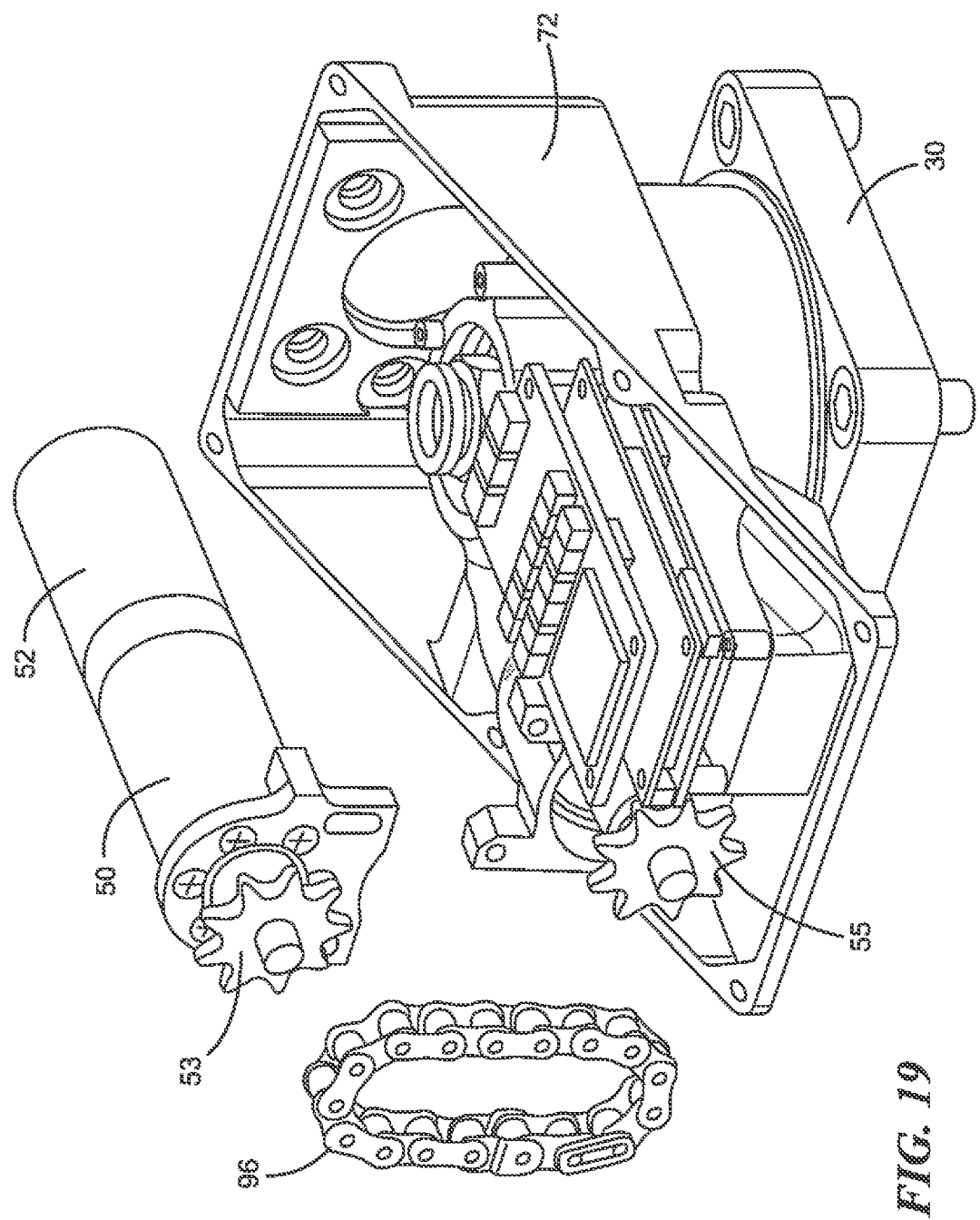
FIG. 19 is a schematic view of another drive module design.

In the example of FIG. 19, motor 50 drives gear head 52 which drive pinion 54 via chain 96 so that the pinion and clutch reside underneath motor 50 and gear head 52. Pulley 53 and gear 55 are both toothed sprockets.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A drive module for rotating a first robot arm member relative to a second robot arm member, the drive module comprising:
   a motor;
   a gear head driven by the motor;
   a pinion driven by the gear head;
   a slip clutch including:
      an input section with integral gear teeth driven by the pinion, and
      an output section configured to be coupled to the second robot arm member; and
   a housing disposed at least about the pinion and slip clutch and configured to be coupled to the first robot arm member.

2. The drive module of claim 1 in which the motor and gear head extends from the housing and resides in the first robot arm member.

3. The drive module of claim 1 further including a belt or chain arrangement between the gear head and the pinion and the gear head drives the pinion via the belt or chain arrangement.

4. The drive module of claim 3 in which the motor and gear head reside in the housing which is coupled to the first arm member.

5. The drive module of claim 1 in which the first arm member is an upper arm and the second arm member is a shoulder.

6. The drive module of claim of claim 1 in which the first arm member is a forearm and the second arm member is an upper arm.

7. The drive module of claim 1 in which the first arm member is a shoulder and the second arm member is a shoulder mount.

8. The drive module of claim 1 in which the gear teeth form a spiroid gear.

9. The drive module of claim 1 in which the pinion rotates around a first axis and the input section rotates about a second axis which does not intersect the first axis.

10. The drive module of claim 1 further including a friction disc between the first robot arm member and the second robot arm member.

11. The drive module of claim 10 further including adjustable screws engaging the friction disc providing a tunable friction force between the first and second robot arm members.

12. The drive module of claim 11 where the adjustable screws incorporate a spring-loaded plunger.

13. The drive module of claim of 1 in which the slip clutch output section includes a hub with friction members mounted on an interior face thereof and the slip clutch input section includes a clutch plate with said gear teeth on an outer face thereof and with an inner face which contacts with said friction members.

14. The drive module of claim 13 in which the hub includes a post and the clutch plate includes an orifice receiving the post therethrough.

15. The drive module of claim 14 in which the slip clutch further includes a fastener secured to the post and a spring member between the fastener and the clutch plate for biasing the clutch plate inner face into engagement with the friction members.

16. The drive module of claim 15 in which the clutch plate includes a raised rim and said spring member is seated on said raised rim.

17. A drive module for rotating a first robot arm member relative to a second robot arm member, the drive module comprising:
- a motor;
- a pinion driven by the motor;
- a slip clutch including:
  - a clutch plate with gear teeth formed on an outer surface thereof engaging the pinion and also including an inner face,
  - a hub configured to be coupled to the second robot arm member and including friction members mounted on an interior face thereof contacting the clutch plate inner face, and
  - a spring member biasing the clutch plate inner face into engagement with said friction members on the hub inner face; and
- a housing configured to be coupled to the first robot arm member.

18. The drive module of claim 17 further including a gear head between the motor and pinion.

19. The drive module of claim 17 in which the motor extends from the housing and resides in the first robot arm member.

20. The drive module of claim 17 in which the first arm member is an upper arm and the second arm member is a shoulder.

21. The drive module of claim of claim 17 in which the first arm member is a forearm and the second arm member is an upper arm.

22. The drive module of claim 17 in which the first arm member is a shoulder and the second arm member is a shoulder mount.

23. The drive module of claim 17 in which the gear teeth form a spiroid gear.

24. The drive module of claim 17 in which the hub includes a post and the clutch plate includes an orifice receiving the post therethrough.

25. The drive module of claim 24 in which the slip clutch further includes a fastener secured to the post and the spring member is between the fastener and the clutch plate for biasing the clutch plate inner face into engagement with the friction members.

26. The drive module of claim 22 further including a friction disc between the shoulder and shoulder mount.

27. The drive module of claim 26 further including adjustable screws engaging in the friction disc to provide a tunable friction force between the shoulder and shoulder mount.

28. The drive module of claim 27 where the adjustable screws incorporate a spring-loaded plunger.

\* \* \* \* \*